C. W. MICHAEL.
GANG PLOW.
APPLICATION FILED FEB. 17, 1912.
1,091,685.
Patented Mar. 31, 1914.
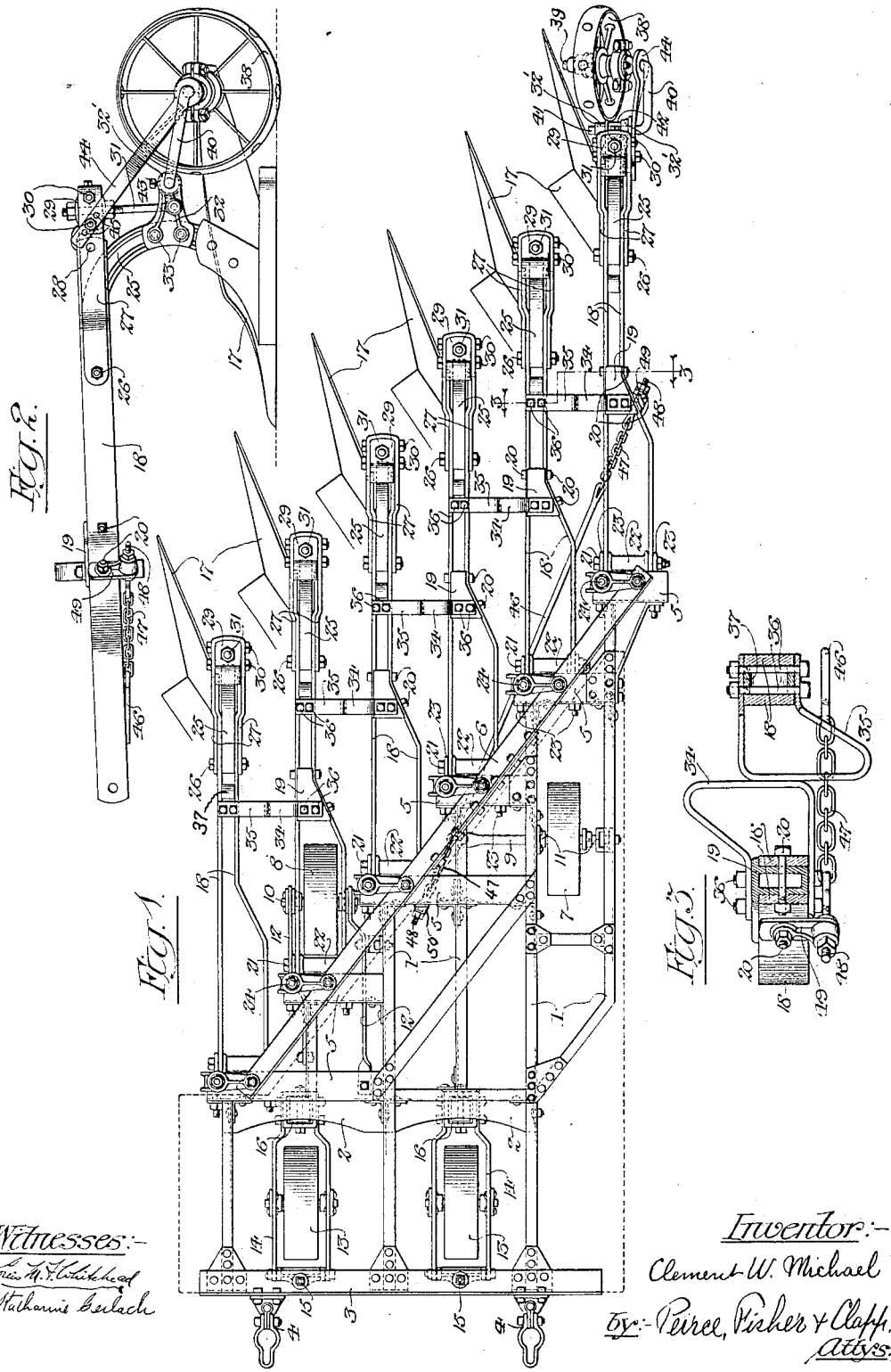

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

GANG-PLOW.

1,091,685.  Specification of Letters Patent.  Patented Mar. 31, 1914.

Application filed February 17, 1912. Serial No. 678,393.

*To all whom it may concern:*

Be it known that I, CLEMENT W. MICHAEL, a citizen of the United States, and a resident of Racine, county of Racine, and State of Wisconsin, have invented certain new and useful Improvements in Gang-Plows, of which the following is a full, clear, and exact description.

The invention relates to gang plows for use in traction engines and more particularly to the type in which a series of individual plow units (each plow unit having one or more plows) are connected to a draft frame in such a manner that the several plow units, when working in the ground, are free to rise and fall independently. With such constructions, considerable difficulty has been encountered in properly spacing the plow units to form furrows of uniform width, since the side thrust thereon tends to throw them out of proper spaced relation. Each separate plow unit sometimes consists of two plows rigidly secured together and in such cases, the difficulty of maintaining the plows in proper position is somewhat less than in cases where each independently movable unit consists of a single plow.

The present invention seeks to provide means for taking up the side thrust upon the plow units and for maintaining the same in proper spaced relation, but which will not interfere with the independent vertical movement of the separate units.

The invention consists in the features of improvement hereinafter set forth, illustrated in the preferred form in the accompanying drawings and more particularly pointed out in the appended claims.

The drawings illustrate the application of the invention to a construction employing single plow units similar to the construction shown in the application for Letters Patent filed by William Sobey, May 25, 1911, Serial No. 629,269. It should be understood, however, that the invention is applicable to other forms having more than one plow in each unit.

Figure 1 is a plan view with the lift mechanism for the plow units omitted. Fig. 2 is a view in side elevation of the rear plow of the series. Fig. 3 is a detail section on the line 3—3 of Fig. 1.

As set forth in the application above referred to, the draft frame is triangular in form and comprises longitudinal bars 1 connected at their forward ends by transverse members 2. Certain of the longitudinal bars extend forwardly beyond the ends of the others and are connected by a transverse bar 3 having draft engaging devices 4 thereon. The rear ends of the longitudinal bars 1 terminate progressively at different distances from the front of the frame and are connected by a series of short transverse angle bars 5 which form an inclined series of steps at the rear portion of the draft frame. The couplings for the individual plows are connected to the step bars 5 and a long inclined brace bar 6 extends over and is secured to the horizontal flanges of these step bars. The rear portion of the draft frame is supported on wheels 7 and 8 mounted on shafts 9 and 10. The shaft 9 is carried by brackets 11 fixed to the rear left hand portion of the draft frame. The shaft 10 is mounted upon the rear ends of a pair of drag bars 12 which extend forwardly and are connected to the right hand portion of the draft frame. The forward portion of the frame is sustained upon two caster wheels 13, the shafts of which are carried in frames 14. At their forward ends, the frames 14 are connected to the bars 3 by vertical pivot bolts 15 and, at their rear ends, the frames are provided with rollers 16 which engage the transverse members 2 of the draft frame. The construction of the draft frame forms no part of the present invention. Any suitable form may be employed.

The plow units are arranged in an inclined series and, in the form shown, each unit comprises a single plow body 17 and a beam therefor comprising a pair of bars 18. The plow beams are independently pivoted at their forward ends to the step bars 5 of the draft frame to permit the independent vertical movement of the individual units or plows. Each of the plow beams, as stated, preferably comprises a pair of bars 18 which are spaced apart and pivotally connected to one of the step bars 5 of the draft frame. The pair of bars of each beam are widely spread apart at their forward ends and one of the bars is offset between its ends so that the rear portions of the beam bars are closer together. At the junction between the rear and front portions of the beam bars, a block 19 is interposed and is secured to the bars by bolts 20. Such a double beam aids in resisting the side pressure upon the plow.

Any suitable form of coupling may be employed for connecting the forward ends of the beam bars 18 to the draft frame. Preferably a coupling is employed which holds the plows against lateral movement, but which permits the independent vertical movement thereof. The form shown comprises a pivot bolt 21 which extends through the forward ends of the beam bars 18 and through a sleeve 22 interposed between the same. The ends of the pivot bolt are engaged by a pair of horizontal I-bolts 23 which extend through the vertical flange of the step bar 5. A vertical adjusting bolt extends through the horizontal flange of the step bar 5 and engages one of the horizontal I-bolts 23. This coupling is more fully set forth in the application above referred to and forms no part of the present invention.

Each plow body 17 is connected to a standard 25 which is curved and extends upwardly and forwardly between the main beam bars 18 and is pivotally connected thereto by a bolt 26. The bolt 26 also pivotally connects the main beam bars to the forward ends of a pair of supplemental beam bars 27, the rear ends of the latter being connected to the rear ends of the main beam bars by wooden break pins 28. A block 29 is secured between the rear ends of the supplemental beam bars 27 by a pair of bolts 30. A vertical adjusting bolt 31 extends through the block 29 and its lower end extends between and is connected to a pair of brackets 32 on the lower end of the plow standard 25. The brackets 32 are connected to the plow standard by a pair of bolts 33 and the brackets project rearwardly therefrom. If the plow strikes an obstruction, the pins 28 are broken and the plow, plow standard and supplemental beams are swung upwardly and forwardly about the pivot pin or bolt 26. Other means may be employed for connecting the plow bodies to the plow beams and the latter may be provided with any suitable form of lift mechanism.

Spacing bumpers are fixed to and interposed between the adjacent plow units of the gang and, in the form shown, between each pair of individual plows. Preferably, two coöperating bumpers having vertical abutting faces in sliding contact are fixed to the beams of each pair of adjacent plows. The beams of the intermediate plows are each provided with two bumpers 34 and 35 fixed to the beams, spaced apart longitudinally thereof and projecting laterally therefrom in opposite directions. The outer rear plow at the left of the gang is provided with a single bumper 34 projecting laterally to the right, and the forward inner plow, at the right of the gang, is provided with a single bumper 35 offset inwardly to the left. The coöperating bumpers 34 and 35 of each pair are arranged in line, and in the form shown are formed of bars bent to triangular form, (see Fig. 3) the parallel end portions of which extend above and below the beam bars 18 of the adjacent plows. Bolts 36 extend through the ends of the bumper bars and between the beam bars 18 to secure the bumpers in position. The bolts 36 of the bumper 34 extend through the filler block 19 and the bolts which secure the bumper 35 in place extend through a filler block 37. The bumpers 34 and 35 are preferably reversely arranged, the bumper 34 projecting upwardly above the plow beams and the bumper 35 downwardly below the same. The corners of the bumper bars are rounded to insure the proper engagement thereof when the plows are raised and lowered.

By means of the pairs of bumpers the plows are held in proper spaced relation to form furrows of uniform width. Moreover, the pressure on any one plow is transmitted through the medium of the contacting bumpers to the plows of the gang on its left or landward side. In this way, each plow aids in resisting the pressure upon all the plows in front or to the right of it. The side thrust is thus greatest upon the outer, rear plow at the land side of the gang and to resist this side thrust, the rear working plow at the left or land side of the gang is provided either with an inclined furrow wheel, or an inclined brace connection to the draft frame, or both, as shown in the drawings.

An inclined trailing furrow wheel 38 is connected to the rear portion of the rear plow and is journaled upon an inclined spindle 39 on the rear end of an arm 40. The brackets 32 of the rear plow of the gang are provided with rearwardly projecting hub-like portions 32' and the arm 40 is provided with a laterally bent or offset portion 41 which extends through the hub portions 32' of the brackets 33. A sleeve 42 is arranged between the hub portions 32' and is secured to the offset 41 of the arm 40 by a set screw 43. In this way, the furrow wheel supporting arm 40 is pivotally connected to the brackets 32. An inclined brace arm 44 is provided with an eye at its lower rear end which engages the lower end of the spindle 39 of the furrow wheel supporting arm. The upper end of the brace arm is provided with a series of holes 45 and one of the bolts 30 extends through one of these holes to adjustably secure the upper end of the brace arm to the rear ends of the supplemental beam bars 27 of the plow. The brace 44 thus holds the furrow wheel against vertical movement relatively to the plow, but, by means of the adjustable connection at its upper end, the relative position of the furrow wheel and plow can be properly adjusted. This arrangement of the furrow wheel does not interfere with the free vertical movement of the plow, but in its position in rear of and adjacent the rear plow body, it is well adapted to resist the side pressure thereon and hence, aid in resisting the pressure on all the plows, which is transmitted to the rear plow through the medium of the contacting pairs of bumpers 34 and 35.

The means for connecting the furrow wheel to the plow is such that the wheel may be connected to any one of the plows of the gang. Thus, if one or more of the plows at the left or landward side of the gang is thrown out of operation or disconnected from the draft frame, the furrow wheel may be readily disconnected from the extreme rear plow of the machine and connected to whichever plow is employed at the rear working plow of the gang. That is to say, if the fifth and sixth plows of the machine are raised out of operation or disconnected from the draft frame, the furrow wheel could be readily coupled to the fourth plow of the series, and act as before to resist the side thrust upon all the plows or plow units. This can be readily effected since the brackets 32 and brace 44 which carry the furrow wheel can be disconnected from the extreme left-hand plow and secured to whichever plow is employed as the rear working plow.

The rear working plow of the gang is also provided with an inclined bracing or truss connection extending between it and the draft frame. This connection is flexibly connected to the rear working plow and to the draft frame so that it will not interfere with the freedom of the movement of the plow. In the preferred form shown, the connection comprises a truss rod 46 connected at its ends by chains 47 to a pair of adjusting I-bolts 48. The I-bolt 48 at the rear, outer end of the bracing connection extends through the lower end of a bracket 49 which is fixed to and depends from the inclined portion of the beam of the rearmost working plow. This bracket is connected to the beam and to the block 19 of the plow by one of the bolts 20. The bracing connection extends forwardly and to the right beneath the plow beams and the I-bolt 48 at its forward end extends through a clip 50 which is secured to one of the step bars 5 of the draft frame. By adjusting the nuts on the I-bolts 48, the desired tension may be placed upon the bracing or truss connection. Furthermore, by loosening the nuts on the coupling bolts 23 and then tightening the nuts on one of the I-bolts 48, all of the plows of the series can be swung to the right or away from the landward side of the gang and the bumpers 34 and 35 brought into engagement to uniformly space the plows and adjust the same relatively to the line of draft. It is obvious that similar brace connections may be applied to one or more of the other plows or units if required.

By means of the bumpers which are fixed to and interposed between the several plow units, the pressure on any one plow or plow unit is transmitted to those at its left or landward side, and the pressure on any one plow is therefore resisted by the plows on its landward side. The pressure on the extreme rear working plow unit, which is not assisted by any of the other plows, is resisted by the furrow wheel 38 and preferably also, by the inclined bracing connection. The furrow wheel and inclined connection assisting, of course, in resisting the side thrust upon all of the plows of the gang. In this way the plows are not only held in proper spaced relation to form furrows of uniform width, but are also held in proper position with reference to the line of draft. At the same time, the spacing bumpers, furrow wheel and flexible bracing connection do not interfere with the proper operation of the plows or with the independent vertical movement of the separate plows or plow units, and the latter are free to rise and fall independently when working in the ground or be raised and lowered independently to and from working position. It should also be noted that the spacing bumpers are in one-way engagement so that there can be no cramping or binding between them to interfere with the independent vertical movement of the individual plows.

It is obvious that changes may be made in the details set forth without departure from the essentials of the invention as defined in the claims.

I claim as my invention:—

1. In a gang plow, the combination with the draft frame, of an inclined series of separate plow units connected to said frame, spacing bumpers fixed to and interposed between said plow units, and an inclined connection between the rear working plow unit and said draft frame, substantially as described.

2. In a gang plow, the combination with the draft frame, of an inclined series of separate plow units connected to said frame, spacing bumpers fixed to and interposed between said plow units, an inclined furrow wheel connected to the rear working plow unit and an inclined, bracing connection flexibly connected to one of said plow units and to said draft frame, substantially as described.

3. In a gang plow, the combination of a wheel supported draft frame having an inclined rear portion, a series of separate plow units pivotally connected at their forward ends to the rear inclined portion of said draft frame to rise and fall independently, spacing devices interposed between the separate plow units, but permitting the independent vertical movement thereof and an inclined bracing connection flexibly connected to said draft frame and to the rear working plow unit, substantially as described.

4. In a gang plow, the combination with the draft frame, of an inclined series of individual trailing plows having beams independently pivoted at their forward ends to said frame, spacing bumpers fixed to and interposed between said plow beams, and an inclined brace flexibly connected to the beam of the outer rear plow and to said draft frame, substantially as described.

5. In a gang plow, the combination with the draft frame, of an inclined series of individual trailing plows having beams independently pivoted at their forward ends to said frame, spacing bumpers fixed to and interposed between said plow beams, an inclined, trailing furrow wheel connected to the rear portion of the outer rear plow of the series, and an inclined brace flexibly connected to said outer rear plow and to said draft frame, substantially as described.

6. In a gang plow, the combination with a draft frame, of an inclined series of separate plow units connected to the frame, of separate trailing plow units connected to the frame to rise and fall independently, pairs of coöperating bumpers having vertical abutting faces fixed to the adjacent plow units, a trailing, inclined furrow wheel connected to the rear portion of the outer rear plow unit, and an inclined brace flexibly connected to said draft frame and to the outer rear plow unit, substantially as described.

7. In a gang plow, the combination with the draft frame, of an inclined series of trailing plows having beams independently pivoted at their forward ends to said frame, coöperating pairs of bumpers fixed to and projecting laterally from adjacent plow beams and having vertical abutting faces in sliding contact whereby the side thrust of any one plow is transmitted to the plow or plows in rear thereof, and an inclined brace extended from said draft frame to one of said plows to aid in resisting the pressure on said plow and upon the plows in advance thereof, substantially as described.

8. In a gang plow, the combination with the draft frame, of an inclined series of trailing plows having beams independently pivoted at their forward ends to said frame, coöperating pairs of bumpers fixed to and projecting laterally from adjacent plow beams and having vertical abutting faces in sliding contact whereby the side thrust of any one plow is transmitted to the plow or plows in rear thereof, and an inclined furrow wheel connected to the rear plow of the series and an inclined brace flexibly connected to said rear plow and to said draft frame, substantially as described.

CLEMENT W. MICHAEL.

Witnesses:
 HARRY L. CLAPP,
 KATHARINE GERLACH.

Copies of this patent may be obtained for five cents each, by addressing the "Commissioner of Patents, Washington, D. C."